US012119188B2

(12) United States Patent
Rostron et al.

(10) Patent No.: US 12,119,188 B2
(45) Date of Patent: Oct. 15, 2024

(54) QUICK-ALIGNMENT LINKAGE FOR A THREE-PHASE ELECTRIC DISCONNECT SWITCH

(71) Applicant: Southern States, LLC, Hampton, GA (US)

(72) Inventors: Joseph R Rostron, McDonough, GA (US); Juan Camilo Gill-Gaviria, Alpharetta, GA (US)

(73) Assignee: SOUTHERN STATES, LLC, Hampton, GA (US)

( * ) Notice: Subject to any disclaimer, the term of this patent is extended or adjusted under 35 U.S.C. 154(b) by 23 days.

(21) Appl. No.: 17/699,208

(22) Filed: Mar. 21, 2022

(65) Prior Publication Data

US 2023/0298827 A1 Sep. 21, 2023

(51) Int. Cl.
*H01H 3/02* (2006.01)

(52) U.S. Cl.
CPC .................................... *H01H 3/02* (2013.01)

(58) Field of Classification Search
CPC .......... H01H 3/02; H01H 31/04; H01H 31/02; H01H 15/24; H01H 9/24; H01H 27/10; H01R 13/04; H01R 13/62
USPC ................................................ 200/48 R, 336
See application file for complete search history.

(56) References Cited

U.S. PATENT DOCUMENTS 6,459,053 B1 * 10/2002 Roberts .................. H01H 33/42 200/48 R
7,534,976 B2 * 5/2009 Crutcher .............. H01H 33/127 218/120
8,226,069 B2 * 7/2012 Devine .................... H02G 1/04 182/2.1

* cited by examiner

*Primary Examiner* — Renee S Luebke
*Assistant Examiner* — Iman Malakooti
(74) *Attorney, Agent, or Firm* — Mehrman Law Office; Michael J. Mehrman

(57) ABSTRACT

A quick-alignment linkage for a three-phase electric disconnect switch includes a drive pipe, a linkage pipe, and a linkage interconnecting the drive pipe and the linkage pipe. The linkage includes quick-alignment straight edge configured to be parallel to the centerline of the drive pipe when the drive pipe is in the fully closed drive pipe position. The quick-alignment straight edge is typically positioned adjacent to a calibration mechanism of the linkage when the drive pipe is in the fully closed drive pipe position. The drive pipe may also include a flat surface with an alignment indicator configured to be parallel to the quick-alignment straight edge when the drive pipe is in the fully closed drive pipe position. The alignment indicator is also positioned adjacent to the calibration mechanism and its quick-alignment straight edge when the drive pipe is in the fully closed drive pipe position.

20 Claims, 8 Drawing Sheets

QUICK-ALIGNMENT LINKAGE FOR A THREE-PHASE ELECTRIC DISCONNECT SWITCH

TECHNICAL FIELD

The present invention relates to high-voltage electric switchgear and, more particularly, to a quick-alignment linkage for a three-phase electric disconnect switch including a straight edge alignment feature providing a visually intuitive guide for setting the linkage for the fully closed switch position.

BACKGROUND

FIG. 1 (prior art) is a conceptual illustration of a conventional three-phase disconnect switch 10 in the open switch position. FIG. 2 (prior art) shows the switch 10 in the closed switch position. The switch 10 includes three sets of rotating insulators 11*a*1-11*a*2, 11*b*1-11*b*2 and 11*c*1-11*c*2, one set for each electric power phase, Phase-A, Phase-B and Phase-C. The insulators 11*a*1, 11*b*1 and 11*c*1 carry a jaws 12*a*, 12*b* and 12*c*, respectively, while the insulators 11*a*2, 11*b*2 and 11*c*2 carry a blade 13*a*, 13*b* and 13*c*, respectively. FIG. 1 shows the disconnect switch 10 in the open switch position, in which the jaws 12*a*, 12*b* and 12*c* are not in electrical contact with their corresponding blades 13*a*, 13*b* and 13*c*. The rotating insulators 11*a*1-11*a*2, 11*b*1-11*b*2 and 11*c*1-11*c*2 are each configured to rotate to bring the jaws 12*a*, 12*b* and 12*c* into electrical contact with their respective blades 13*a*, 13*b* and 13*c*. When the switch 10 is in the fully closed switch position, the blades 13*a*, 13*b* and 13*c* must be properly seated in their respective jaws 12*a*, 12*b* and 12*c* to avoid damaging arcing in the switch connections.

The switch 10 includes a motor-driven or hand-driven actuator, not shown in the figures, for a moving a drive pipe 14 to simultaneously rotate the insulators 11*a*1-11*a*2, 11*b*1-11*b*2 and 11*c*1-11*c*2 to open and close the switch. A conventional linkage 15 connects the drive pipe 14 to the insulators allowing the single drive pipe to rotate all six insulators. The conventional linkage 15 includes a linkage pipe 16 connecting the drive pipe 14 through a series of mechanical connections to phase operating levers 18*a*, 18*b* and 18*c*, one for each electric power phase. The connecting rod 19*a* connects the phase operating lever 18*a* to both rotating insulators 11*a*1-11*c*2 for Phase-A, the connecting rod 19*b* connects the phase operating lever 18*b* both rotating insulators 11*b*1-11*b*2 for Phase-B, and the connecting rod 19*c* connects the phase operating lever 18*c* to both rotating insulators 11*c*1-11*c*2 for Phase-C.

The conventional linkage 15 includes a first clevis joint 17*a* at the junction between the linkage pipe 16 and the phase operating lever 18*a* for Phase-A, a second clevis joint 17*b* at the junction between the linkage pipe 16 and the phase operating lever 18*b* for Phase-B, and a third clevis joint 17*c* at the junction between the linkage pipe 16 and the phase operating lever 18*c* for Phase-C. In this particular example, the conventional linkage 15 also includes a fourth clevis joint 17*d* at the junction between the drive pipe 14 and the phase operating lever 18*b* for Phase-B. In other embodiments, the drive pipe may be connected to Phase-A, Phase-B or Phase-C as a matter of design choice. In addition, in this particular example, the drive pipe 14 is shown to be parallel to the linkage pipe 16. In other embodiments, the drive pipe 14 may be positioned at different angles with respect to the linkage pipe 16 as a matter of design choice.

While the conventional three-phase disconnect switch 10 has served the industry well for decades, it experiences a significant drawback when initially setting up the conventional linkage for the fully closed switch position, which requires precise mechanical calibration. Each of pair of rotating insulators is mechanically fixed to a separate frame, which can result in slight differences in the relative positions of each insulator to the other insulators and to the linkage. The linkage must be calibrated precisely to ensure that each insulator rotates fully so that each blade seats properly within its respective jaws to properly close each phase of the switch. Calibrating the entire linkage is a painstaking process because multiple calibration points have to be manually adjusted. Each linkage pipe typically has its own length adjustment mechanism and changing the length or position of one piece of the linkage can impact the other parts of the linkage. As the relative angles between the linkage pipes and the rotating insulators is critical to the proper operation of the switch, setting the linkage to achieve the correct rotational angles of all six insulators requires multiple measurements and length adjustments. This frequently requires multiple trial-and-error adjustments to achieve the correct calibration. The process has been likened to tuning a piano, where adjustment of each string impacts the notes produced by the other strings.

The electric power industry therefore has a continuing need for improved linkage techniques for three-phase disconnect switches.

SUMMARY

The problem described above is mitigated by a quick-alignment linkage for a three-phase electric disconnect switch with rotating insulators for opening and closing the switch. An actuator connected to an actuator arm provides the motive force for opening and closing the switch. The actuator arm is connected to a drive pipe, which is connected through a series of mechanical connection to the other components of the quick-alignment linkage. The linkage includes a linkage pipe that rotates the insulators of the disconnect switch to open and close the switch. To aid in setting the linkage for the fully closed switch position, the linkage includes a quick-alignment straight edge configured to be parallel to the centerline of the drive pipe when the drive pipe is in the fully closed drive pipe position.

The quick-alignment straight edge is typically positioned adjacent to a calibration mechanism of the linkage when the drive pipe is in the fully closed drive pipe position. For example, the linkage may include a vernier operating lever, a vernier drive gear, and vernier calibration mechanism adjustably connecting the vernier operating lever to the vernier drive gear. In this embodiment, the quick-alignment straight edge is typically positioned adjacent to the vernier calibration mechanism when the drive pipe is in the fully closed position. In addition, the drive pipe may include a flat surface with an alignment indicator configured to be parallel to the quick-alignment straight edge when the drive pipe is in the fully closed position. The alignment indicator is also positioned adjacent to the calibration mechanism and the quick-alignment straight edge when the drive pipe is in the fully closed position.

It will be understood that specific embodiments may include a variety of features in different combinations, and that all of the features described in this disclosure, or any particular set of features, needs to be included in particular embodiments. The specific techniques and structures for implementing particular embodiments of the invention and accomplishing the associated advantages will become apparent from the following detailed description of the embodiments and the appended drawings and claims.

BRIEF DESCRIPTION OF THE FIGURES

The numerous advantages of the invention may be better understood with reference to the accompanying figures in which.

DESCRIPTION OF ILLUSTRATIVE EMBODIMENTS

An illustrative example of the invention is embodied in a quick-alignment linkage for a three-phase electric disconnect switch with rotating insulators for opening and closing the switch. An actuator connected to an actuator arm provides the motive force for operating the switch. The quick-alignment linkage includes a drive pipe, a linkage pipe, and a linkage interconnecting the drive pipe and the linkage pipe. The linkage includes quick-alignment straight edge configured to be parallel to the centerline of the drive pipe when the drive pipe is in the fully closed drive pipe position. The quick-alignment straight edge is typically positioned adjacent to a calibration mechanism of the linkage when the drive pipe is in the fully closed drive pipe position. The drive pipe may also include a flat surface with an alignment indicator configured to be parallel the quick-alignment straight edge when the drive pipe is in the fully closed drive pipe position. The alignment indicator is also positioned adjacent to the calibration mechanism and the quick-alignment straight edge when the drive pipe is in the fully closed drive pipe position.

The linkage calibration mechanism effectively allows fine adjustment of the relative position of the drive pipe with respect to the linkage pipe, which in turn sets the relative position of the actuator arm with respect to the switch blades and jaws. In a representative embodiment, the calibration mechanism includes a linkage operating lever connected to the drive pipe, a linkage drive gear connected to the linkage pipe, and a calibration mechanism for finely adjusting the rotational position of the linkage drive gear with respect to the linkage operating lever. In the quick-alignment linkage, either the linkage drive gear or the linkage operating lever may define a quick-alignment straight edge to aid in setting the drive pipe in the fully closed drive pipe position, which also sets the linkage operating lever in its fully closed position. The technician then rotates the linkage drive gear to its fully closed position and pins calibration mechanism to set the mechanism for the fully closed switch position. Finally, the technician moves the actuator arm to its fully closed position and tightens the actuator arm to the drive pipe to complete the linkage set up for the fully closed switch position.

Figure 1:
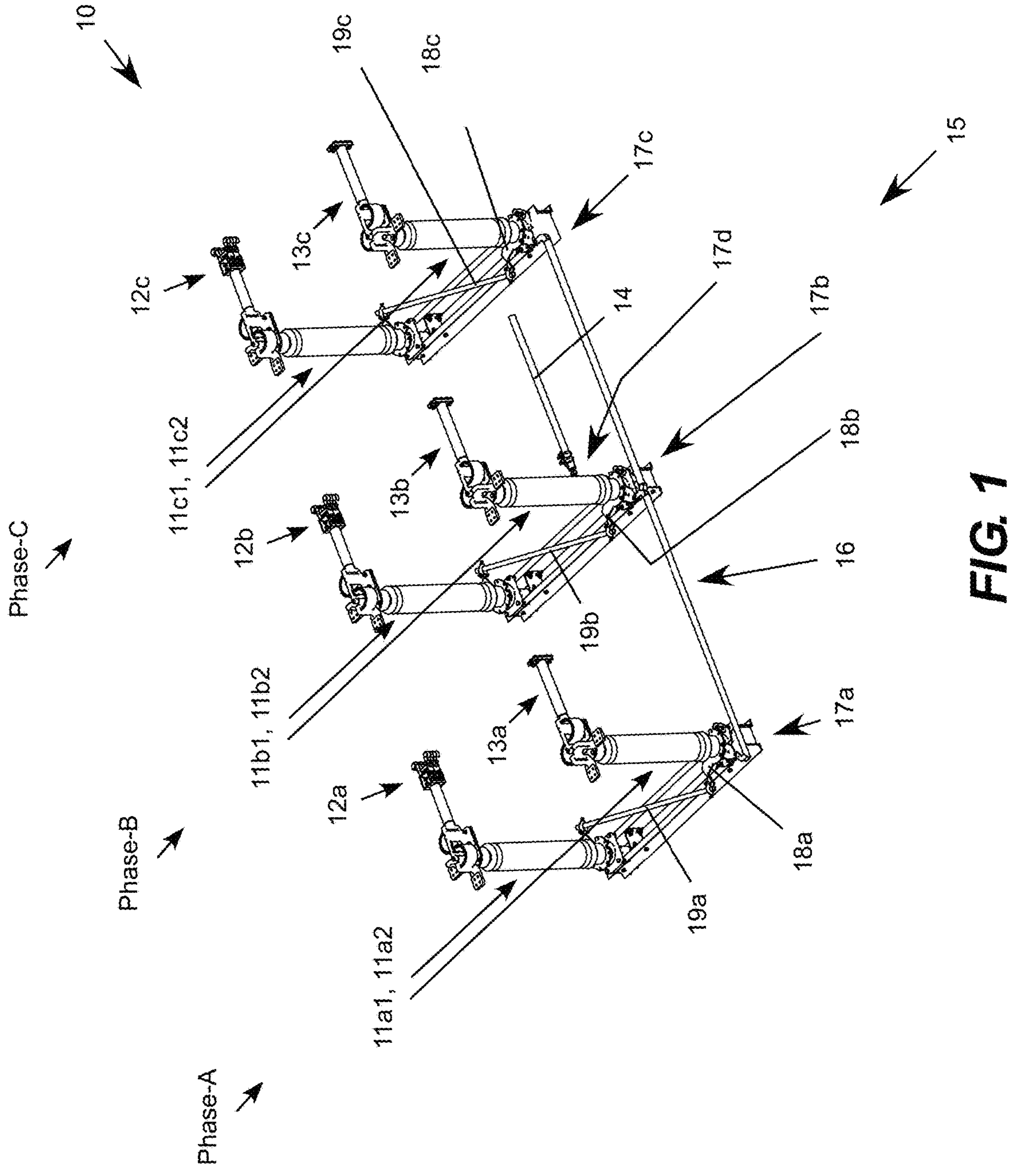
FIG. 1 (Prior Art)
FIG. 1 (prior art) is a conceptual perspective illustration of a conventional three-phase disconnect switch in the open position.
Figure 2:
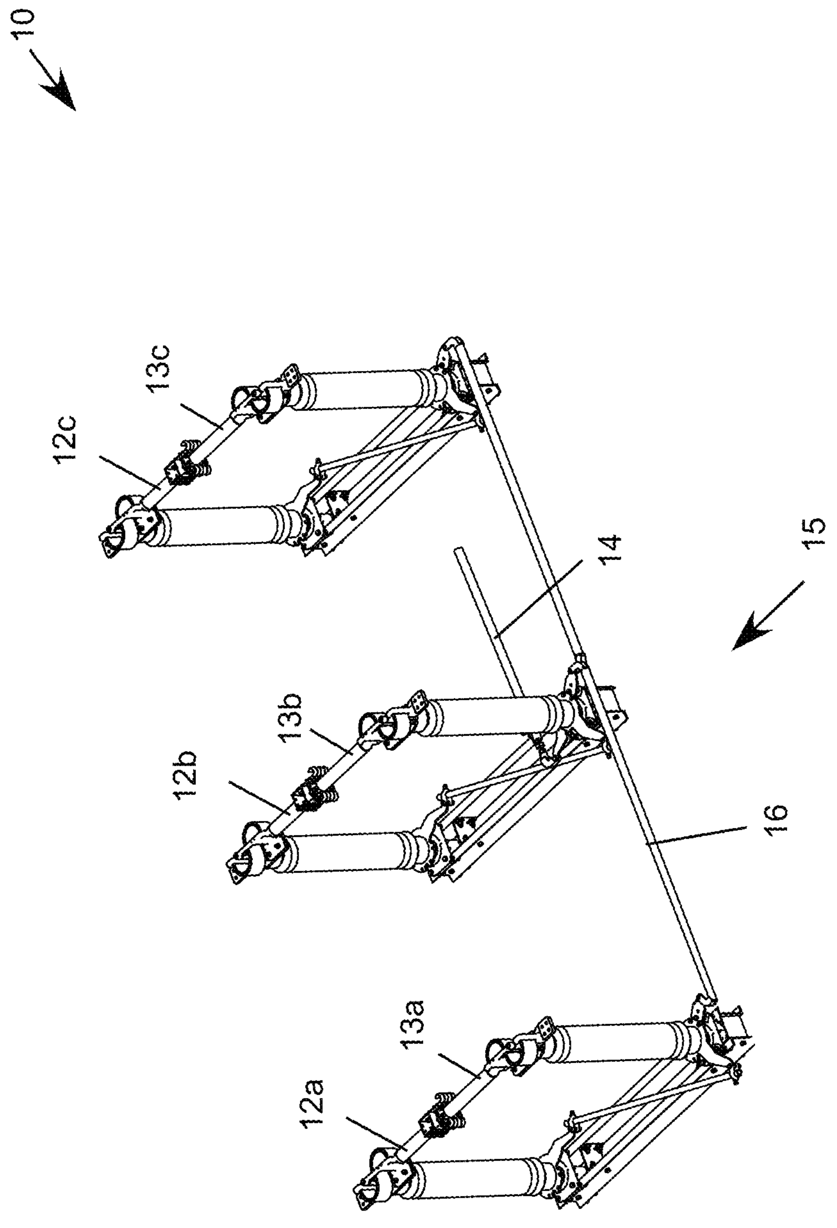
FIG. 2 (Prior Art)
FIG. 2 (prior art) is a conceptual perspective illustration of the conventional three-phase disconnect switch in the closed position.
Figure 3A:
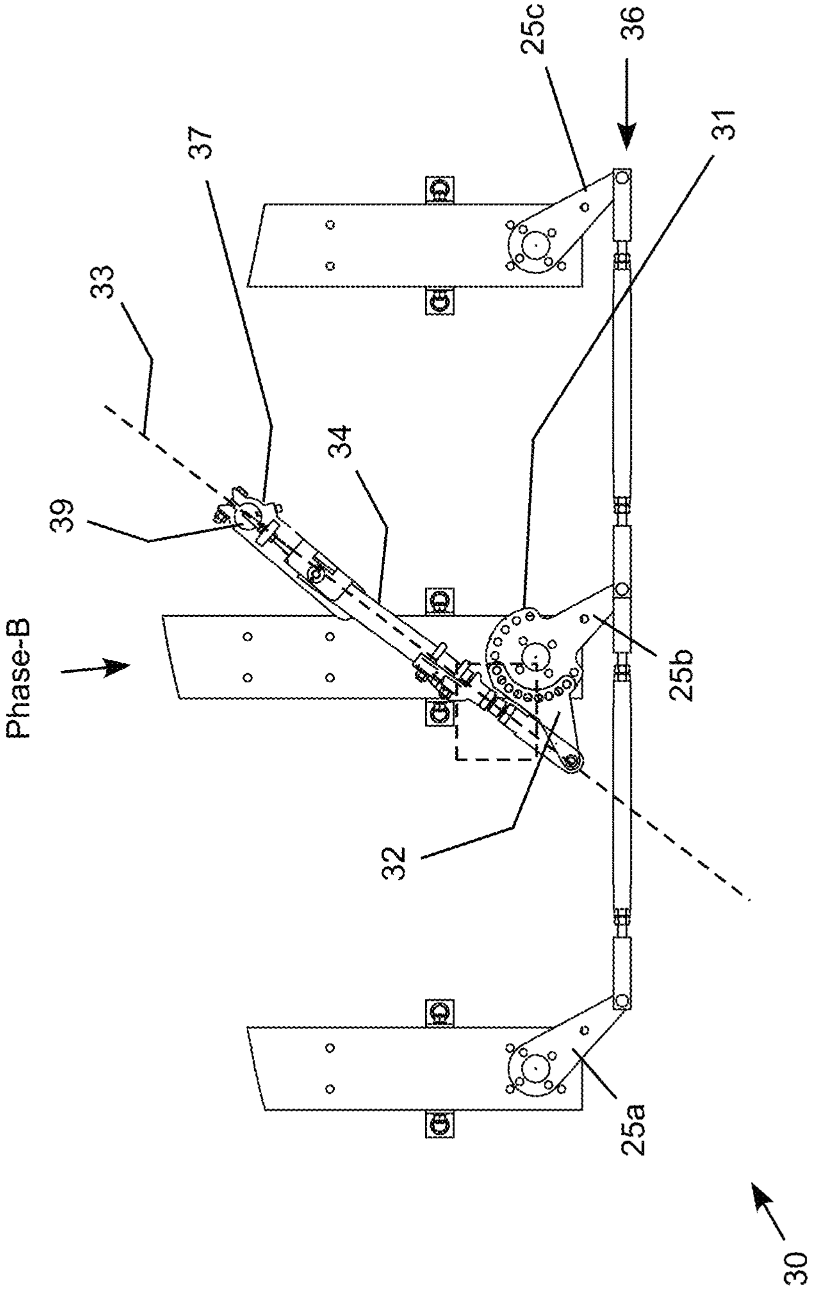
FIG. 3A is a top view and FIG. 3B is an enlarged view of a portion of a quick-alignment linkage including a quick-alignment straight edge attached to a Phase-B insulator of a three-phase electric disconnect switch.
Figure 3B:
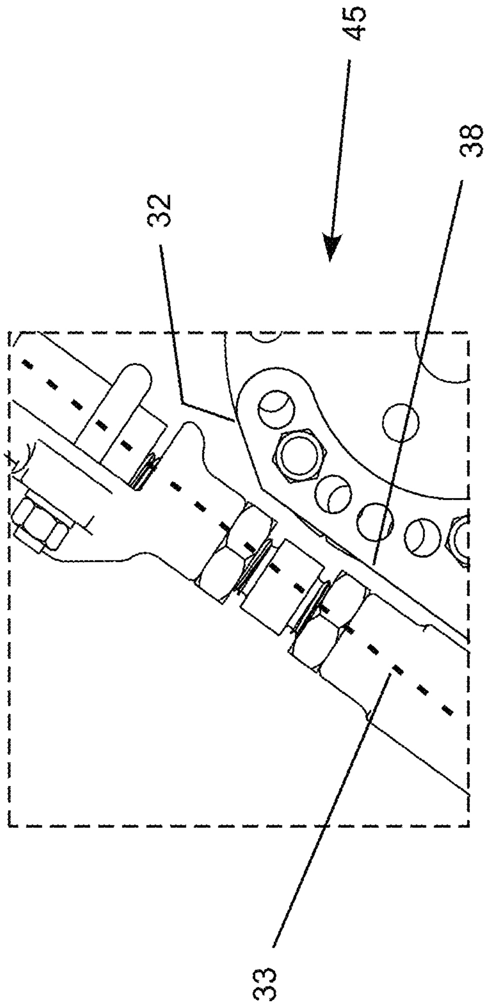

FIG. 3A is a top view and FIG. 3B is an enlarged view of a portion of a representative embodiment, a quick-alignment linkage 30 including a quick-alignment straight edge 38 attached to a Phase-B insulator of a three-phase electric disconnect switch. One of the first steps in the linkage calibration process is setting the drive pipe 34 to the fully closed drive pipe position to begin the process of setting up the linkage for the fully closed switch position with the blade arms for all three-phases properly seated in their respective jaws. Setting the linkage for the fully closed switch position is accomplished by moving the drive pipe 34 to the fully closed drive pipe position, moving the linkage pipe 36 to its fully closed position, which rotates the insulators to their fully closed positions, and pining the linkage calibration mechanism 45 to maintain the relative positions of the drive pipe and the linkage pipe for the fully closed switch position. The technician then moves the switch actuator arm 39 to its fully closed position, which creates the proper calibration between the drive pipe 34 and the actuator arm 39 for the fully closed switch position. The technician then tightens the drive pipe 34 to the actuator arm at the actuator arm fitting 37, which completes the linkage setup for the fully closed switch position.

In the particular example shown in FIGS. 3A-3B, the linkage pipe 36 is connected to three phase operating levers 25*a*, 25*b* and 25*c* that rotate respective phase insulators to open and close their respective phase switches. The connecting rods and phase operating levers for the other insulators are not shown to avoid cluttering the figure. To allow for adjustable alignment, the linkage 30 includes a vernier drive gear 31 underlying a vernier operating lever 32. A vernier calibration mechanism 45 allows fine adjustment of the relative position of the vernier drive gear 31 with respect to the vernier operating lever 32. In this embodiment, the vernier operating lever 32 includes a quick-alignment straight edge 38 to aid in setting the drive pipe 34 and the linkage pipe 36 so that they are each in their fully closed positions to set the vernier calibration mechanism 45 for the fully closed switch position. The vernier calibration mechanism 45 is formed by a series of holes through the vernier drive gear 31 and the underlying vernier operating lever 32 for receiving connecting pins to attach the vernier drive gear to the vernier operating lever in a wide range of relative rotational positions. The vernier calibration mechanism 45 thus allows fine adjustment of the relative position of the vernier drive gear 31 with respect to the vernier operating lever 32, which in turn allows fine adjustment of the relative position of the drive pipe 34 with respect to the linkage pipe 36, which in turn allows fine adjustment of the relative position of the actuator arm 39 with respect to the phase operating levers 25*a*, 25*b* and 25*c*.

To set the quick-alignment linkage 30 for the fully closed switch position, the technician moves the drive pipe 34 to the fully closed drive pipe position (downward and to the left to its full-stop-position in the illustration) setting the angle of the center line 33 of the drive pipe for the fully closed switch position. The technician also moves the linkage pipe 36 to its fully closed switch position (to the right to its full-stop-position in the illustration) to rotate the phase insulators into their fully closed positions. The technician then pins the vernier calibration mechanism 45 to set the relative positions of the of the drive pipe 34 and the linkage pipe 36 for the fully closed switch position. More specifically, the technician inserts pins through the vernier holes that line-up to secure the vernier drive gear 31 to the vernier operating lever 32 when the drive pipe 34 and the linkage pipe 36 are both held in their fully closed positions. Once the calibration mechanism 45 is properly set for the fully closed switch position, the technician positions the actuator arm 39 into its fully closed position and tightens the actuator arm fitting 37 to secure the drive pipe 34 to the actuator arm 39, which sets the actuator into its fully closed position, completing the linkage setup for the fully closed switch position.

To allow for quick positioning of the drive pipe 34 in the fully closed drive pipe position, the vernier operating lever 32 includes a quick-alignment straight edge 38 allowing the technician to quickly confirm the drive pipe 34 is in the fully closed drive pipe position, which also sets the vernier operating lever 32 in its fully closed position. More specifically, the quick-alignment straight edge 38 on the vernier operating lever 32 is parallel to the center line 33 of the drive pipe 34 when the drive pipe is in the fully closed drive pipe position. The quick-alignment straight edge 38 thus provides a visually intuitive, at-a-glance guide allowing the technician to easily confirm drive pipe 34 is properly set for the fully closed switch position.

The relative angle between the drive pipe and the linkage pipe is critical to the proper operation of the switch. For a conventional linkage, setting the drive pipe and the linkage operating lever to the correct angle often requires multiple measurements and counting of holes, which is difficult to do correctly and prone to human error. Frequently, this takes multiple trial-and-error adjustments to set correctly. In the innovative linkage 30, the vernier operating lever 32 includes the alignment straight edge 38 making the critical drive pipe fully closed position visual intuitive while eliminating the potential for human error in the measurements and counting of holes used for conventional linkage adjustment. In this particular embodiment, the quick-alignment straight edge 38 is defined on the vernier operating lever 32 so that the drive pipe 34 is in the fully closed drive pipe position when the quick-alignment straight edge 38 is parallel to the center line 33 of the drive pipe. After setting the position of the operating lever 32 with respect to the drive pipe 34 for the fully closed switch position, the technician rotates vernier drive gear 31 into its fully closed position, which sets the linkage pipe 36 in its fully closed position, which rotates the switch insulators into their fully closed positions with the switch blades properly seated in their respective jaws. The technician then pins the vernier operating lever 31 to the vernier drive gear 32 to set the calibrating mechanism 45 for the fully closed switch position. An enlarged view of this alignment is shown in the detail portion shown in FIG. 3B.

The quick-alignment straight edge 38 allows the technician to move the drive pipe 34 to its full-stop, fully closed position (down and to the left in the illustration), and then quickly confirm that it is, in fact, in the fully closed drive pipe position by visually checking to make sure the quick-alignment straight edge 38 is parallel to the centerline of the drive pipe 34. Once that visual check is confirmed, the technician quickly moves on to setting the position of the vernier drive gear 31 to its fully closed position by rotating it counter-clockwise to its full-stop position. This sets the linkage pipe 36 in its fully closed position (to the right in the illustration), which rotates the switch insulators into their fully closed positions with the switch blades properly seated in their respective jaws. The technician then pins the vernier calibration mechanism 45 to set the drive pipe 34 and the linkage pipe 36 for the fully closed switch position. The technician then moves on to setting the actuator arm 39 into its fully position and tightens the actuator arm fitting 37 to secure the drive pipe 34 to the actuator arm, which completes the linkage setup for the fully closed switch position. The quick-alignment straight edge 38 allows the linkage to be set quickly while effectively eliminating the chance of securing the linkage in the wrong position and having to start over.

Figure 4:
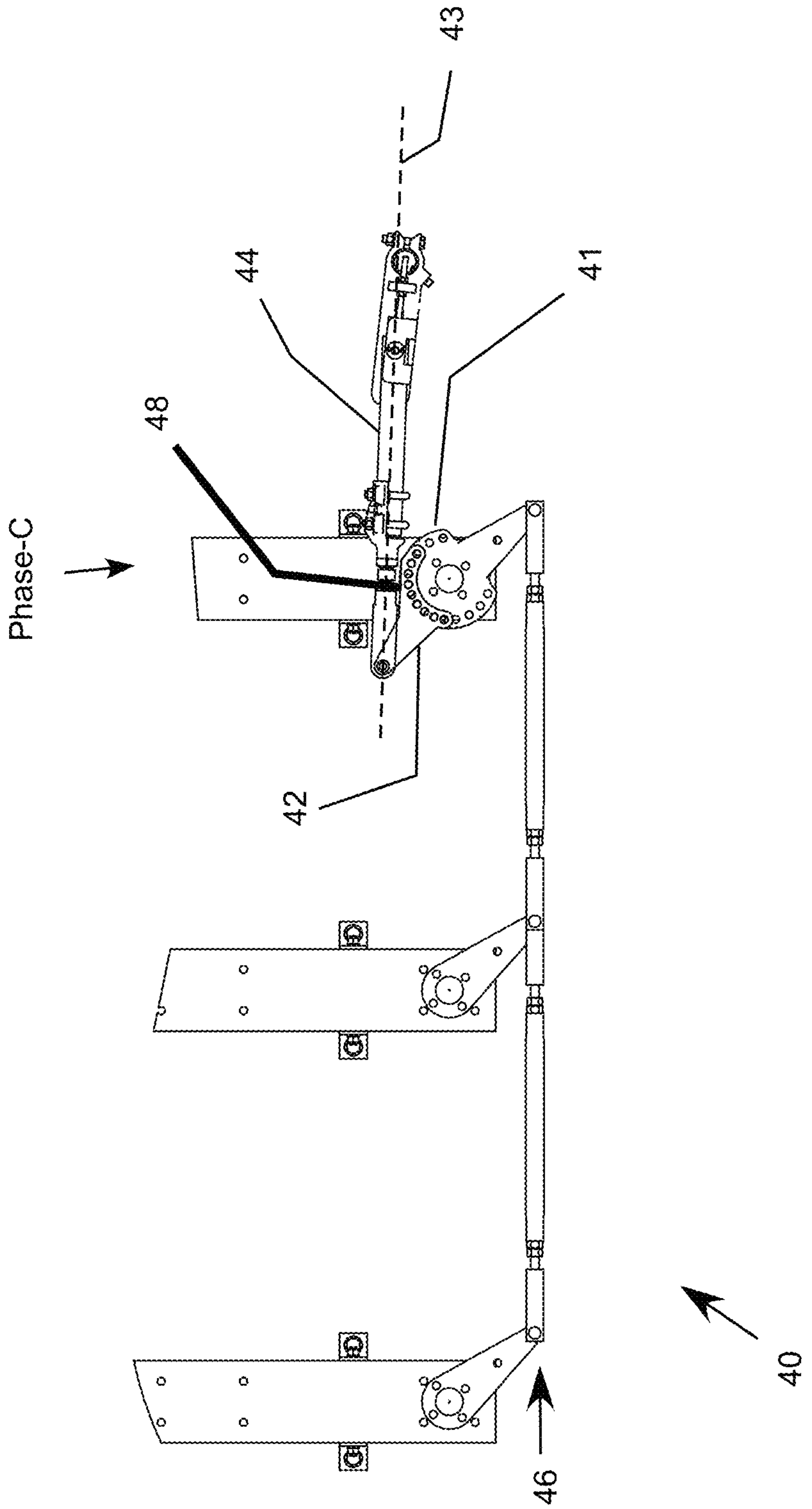
FIG. 4 is a top view of a first example of a quick-alignment linkage including a quick-alignment straight edge attached to a Phase-C insulator of a three-phase electric disconnect switch.

It should be noted that the drive pipe 34 need not be attached to a Phase-B insulator, but may be attached to any of the phase insulators as a matter of design choice. For example, FIG. 4 shows a quick-alignment linkage 40 in which the drive pipe 44 is attached to a Phase-C insulator. Regardless of which insulator is connected to the drive pipe, the technician still aligns the quick-alignment straight edge 48 with the center line 43 of the drive pipe 44 to set the position of the linkage 54 for the fully closed switch position.

Figure 5:
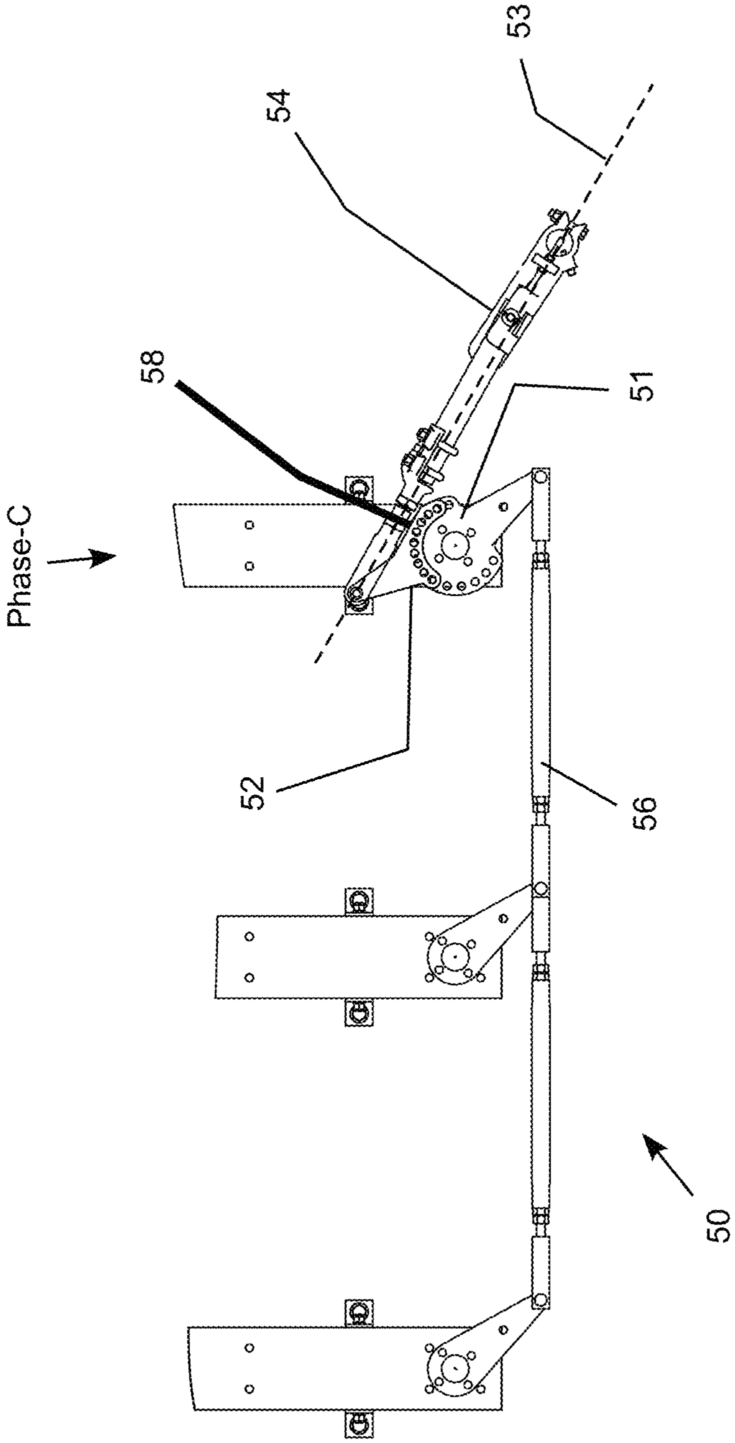
FIG. 5 is a top view of a second example of quick-alignment linkage including a quick-alignment straight edge attached to a Phase-C insulator of a three-phase electric disconnect switch.

Similarly, the drive pipe 34 need not be attached to a rotating insulator parallel to the linkage pipe, but may be attached any desired angle with respect to the linkage pipe as a matter of design choice. For example, FIG. 5 shows a quick-alignment linkage 50 in which the drive pipe 54 is attached at an acute angle to the linkage pipe 56. Regardless of the angle between the drive pipe 54 and the linkage pipe 56, the technician still aligns the quick-alignment straight edge 58 with the center line 53 of the drive pipe 54 to set the position of the drive pipe for the fully closed switch position.

Figure 6A:
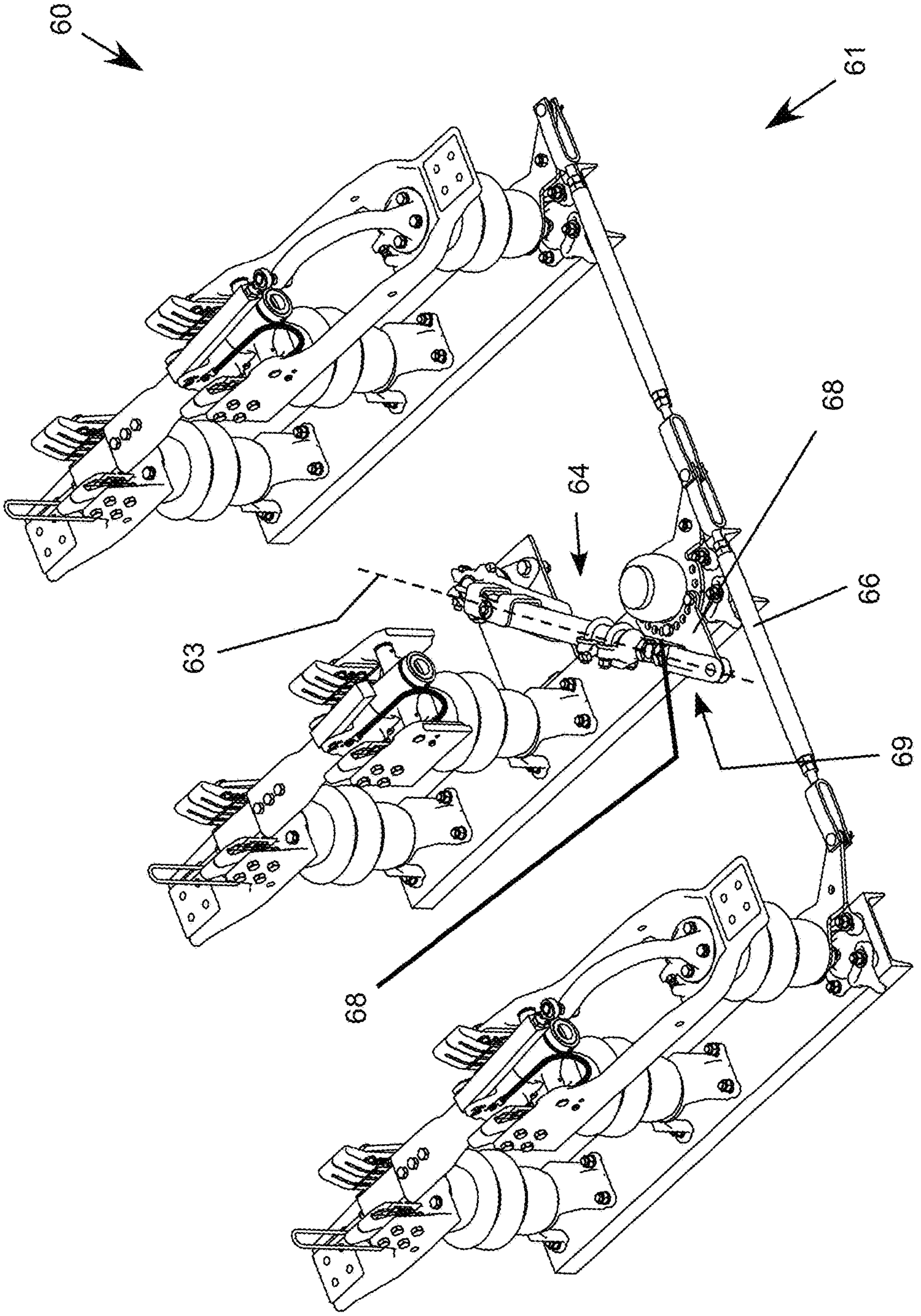
FIG. 6A shows a perspective view of a three-phase electric disconnect switch with a quick-alignment linkage.
Figure 6B:
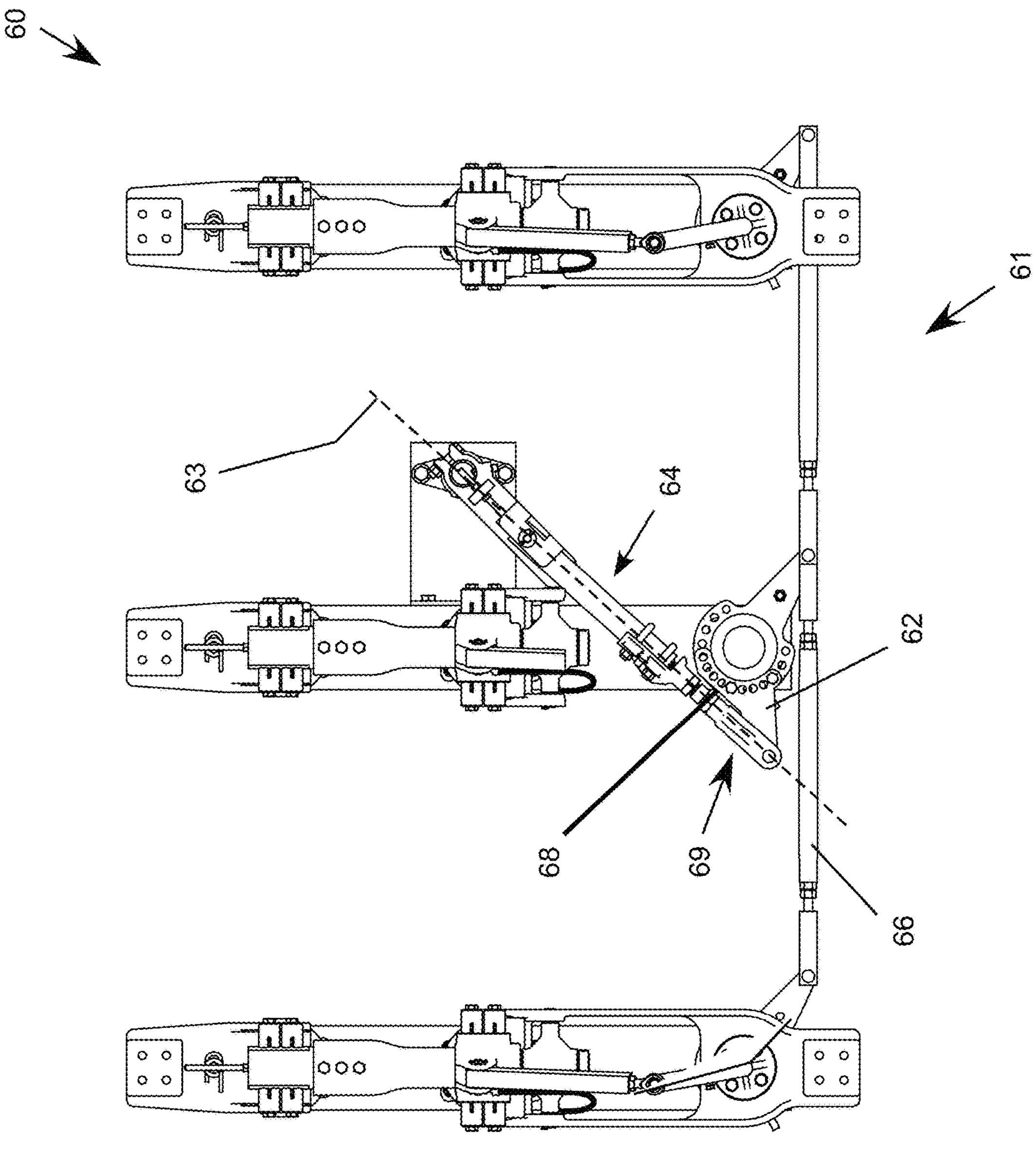
FIG. 6B shows a top view of the three-phase electric disconnect switch with the quick-alignment linkage.

To provide additional context, FIG. 6A shows a perspective view and FIG. 6B shows a top view of a representative three-phase electric disconnect switch 60 with a quick-alignment linkage 61. The technician visually confirms that the drive pipe 64 is in the fully closed drive pipe position when the quick-alignment straight edge 68 on the vernier operating lever 62 is parallel with the center line 63 of the drive pipe 64. To provide an additional visual guide, the end portion of the drive pipe 64 connected to the vernier operating lever 62 includes flat surface with an alignment indicator 69, in this example one or more engraved and painted lines parallel to the center line 63 of the drive pipe 64 when the drive pipe is in the fully closed drive pipe position. As the alignment indicator 69 is configured to be parallel with the quick-alignment straight edge 68 on the vernier operating lever 62 when the drive pipe 64 is in the fully closed drive pipe position, this reinforces the visual indication provided by the quick-alignment straight edge 68. The flat surface with the alignment indicator 69 is also positioned adjacent to the calibration mechanism and the quick-alignment straight edge 68 when the drive pipe is in the fully closed drive pipe position.

The quick-alignment linkage itself is not tied to any particular switch configuration and may be employed with any suitable three-phase linkage. In view of the foregoing, it will be appreciated that present invention provides significant improvements distribution automation system for high voltage electric power transmission and distribution systems. The foregoing relates only to the exemplary embodiments of the present invention, and numerous changes may be made therein without departing from the spirit and scope of the invention as defined by the following claims.

The invention claimed is:

1. A quick-alignment linkage for a three-phase electric disconnect switch, comprising:

a drive pipe having a fully closed drive pipe position;

a linkage comprising a phase operating lever operative to open and close the disconnect switch and a linkage operating lever connected to the drive pipe;

a calibration mechanism adjustable to interconnect the phase operating lever and the linkage operating lever at multiple operational angles; and the calibration mechanism comprising a quick-alignment straight edge configured to be aligned relative to a position of the drive pipe when the drive pipe is in the fully closed drive pipe position to guide setting the position of the drive pipe when adjusting the calibration mechanism during setup of the linkage.

2. The quick-alignment linkage of claim 1, wherein the quick-alignment straight edge is aligned parallel to a centerline of the drive pipe when the drive pipe is in the fully closed drive pipe position.

3. The quick-alignment linkage of claim 1, wherein the calibration mechanism provides adjustment of a rotational position of the linkage operating lever with respect to a rotational position of the phase operating lever.

4. The quick-alignment linkage of claim 1, wherein the drive pipe further comprises a flat surface with an alignment indicator configured to be parallel to the quick-alignment straight edge when the drive pipe is in the fully closed drive pipe position.

5. The quick-alignment linkage of claim 4, wherein the alignment indicator is positioned adjacent to the quick-alignment straight edge when the drive pipe is in the fully closed drive pipe position.

6. The quick-alignment linkage of claim 1, wherein the drive pipe and the quick-alignment straight edge are parallel to each other when the drive pipe is in the fully closed drive pipe position.

7. The quick-alignment linkage of claim 1, wherein drive pipe and the linkage operating lever are at an acute angle to each other when the drive pipe is in the fully closed drive pipe position.

8. A three-phase electric disconnect switch comprising a quick-alignment linkage and having a fully closed switch position, comprising:

an actuator arm;

rotating insulators operative to open and close the disconnect switch to the fully closed switch position;

a drive pipe connected to the actuator arm having a fully closed drive pipe position corresponding to the fully closed switch position;

a linkage comprising a phase operating lever operative to rotate the rotating insulators and a linkage operating lever connected to the drive pipe;

a calibration mechanism adjustable to interconnect the phase operating lever and the linkage operating lever at multiple operational angles; and the linkage further comprising a quick-alignment straight edge configured to be aligned relative to a position of the drive pipe when the drive pipe is in the fully closed drive pipe position to guide setting the position of the drive pipe when adjusting the calibration mechanism during setup of the linkage.

9. The three-phase electric disconnect switch of claim 8, wherein the quick-alignment straight edge is aligned parallel to a centerline of the drive pipe when the drive pipe is in the fully closed drive pipe position.

10. The three-phase electric disconnect switch of claim 8, wherein the calibration mechanism provides adjustment of a rotational position of the linkage operating lever with respect to a rotational position of the phase operating lever.

11. The three-phase electric disconnect switch of claim 8, wherein the drive pipe further comprises a flat surface with an alignment indicator configured to be parallel to the quick-alignment straight edge when the drive pipe is in the fully closed drive pipe position.

12. The three-phase electric disconnect switch of claim 11, wherein the alignment indicator is positioned adjacent to the quick-alignment straight edge when the drive pipe is in the fully closed drive pipe position.

13. The three-phase electric disconnect switch of claim 8, wherein the drive pipe and the quick-alignment straight edge are parallel to each other when the drive pipe is in the fully closed drive pipe position.

14. The three-phase electric disconnect switch of claim 8, wherein drive pipe and the linkage operating lever are at an acute angle to each other when the drive pipe is in the fully closed drive pipe position.

15. A three-phase electric disconnect switch comprising a quick-alignment linkage and an actuator arm;

rotating insulators operative to open and close the disconnect switch to the fully closed switch position;

phase operating levers configured to rotate respective rotating insulators to the fully closed switch position;

a drive pipe connected to the actuator arm having a fully closed drive pipe position corresponding to the fully closed switch position;

a linkage pipe connected to the phase operating levers;

a linkage operating lever connected to the drive pipe;

a linkage drive gear connecting the linkage operating lever to one of the phase operating levers, a calibration mechanism adjustable to interconnect the drive pipe to the linkage pipe at multiple operational angles;

the linkage operating lever or the linkage drive gear defining a quick-alignment straight edge configured to be aligned relative to a position of the drive pipe when the drive pipe is in the fully closed drive pipe position to guide setting the position of the drive pipe when adjusting the calibration mechanism during setup of the linkage.

16. The three-phase electric disconnect switch of claim 15, wherein the quick-alignment straight edge is aligned parallel to a centerline of the drive pipe when the drive pipe is in the fully closed drive pipe position.

17. The three-phase electric disconnect switch of claim 15, wherein the drive pipe further comprises a flat surface with an alignment indicator configured to be parallel to the quick-alignment straight edge when the drive pipe is in the fully closed drive pipe position.

18. The three-phase electric disconnect switch of claim 17, wherein the flat surface with the alignment indicator is positioned adjacent to the quick-alignment straight edge when the drive pipe is in the fully closed drive pipe position.

19. The three-phase electric disconnect switch of claim 15, wherein the calibration mechanism provides adjustment of a rotational position of the linkage operating lever with respect to a rotational position of the linkage drive gear.

20. The three-phase electric disconnect switch of claim 15, wherein the linkage operating lever defines the quick-alignment straight edge.

* * * * *